(No Model.) 2 Sheets—Sheet 1.
J. W. HOWELL.
MODE OF CONNECTING AND DISCONNECTING GENERATORS FOR ELECTRIC LIGHTING.
No. 353,035. Patented Nov. 23, 1886.
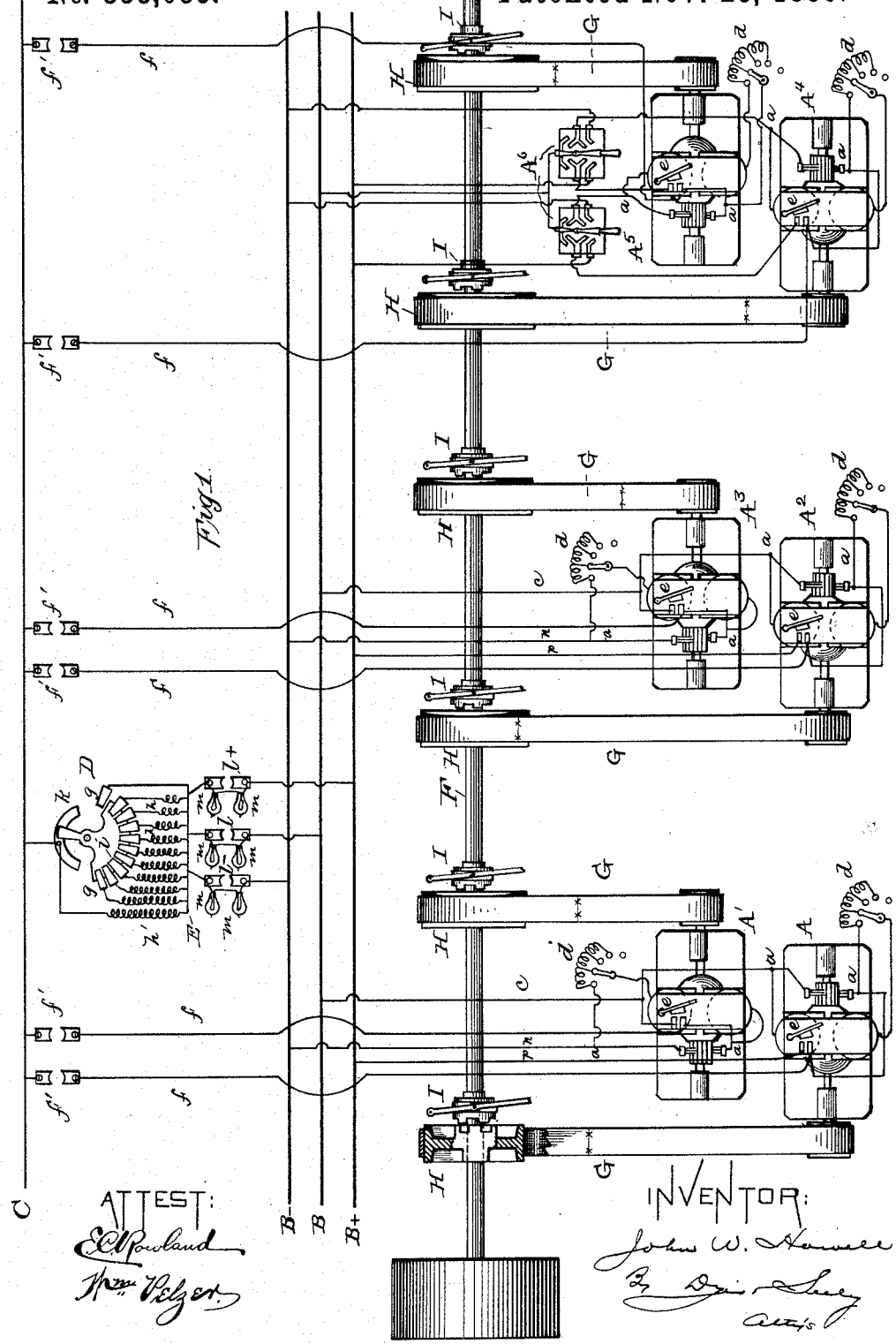

(No Model.) 2 Sheets—Sheet 2.
J. W. HOWELL.
MODE OF CONNECTING AND DISCONNECTING GENERATORS FOR ELECTRIC LIGHTING.
No. 353,035. Patented Nov. 23, 1886.
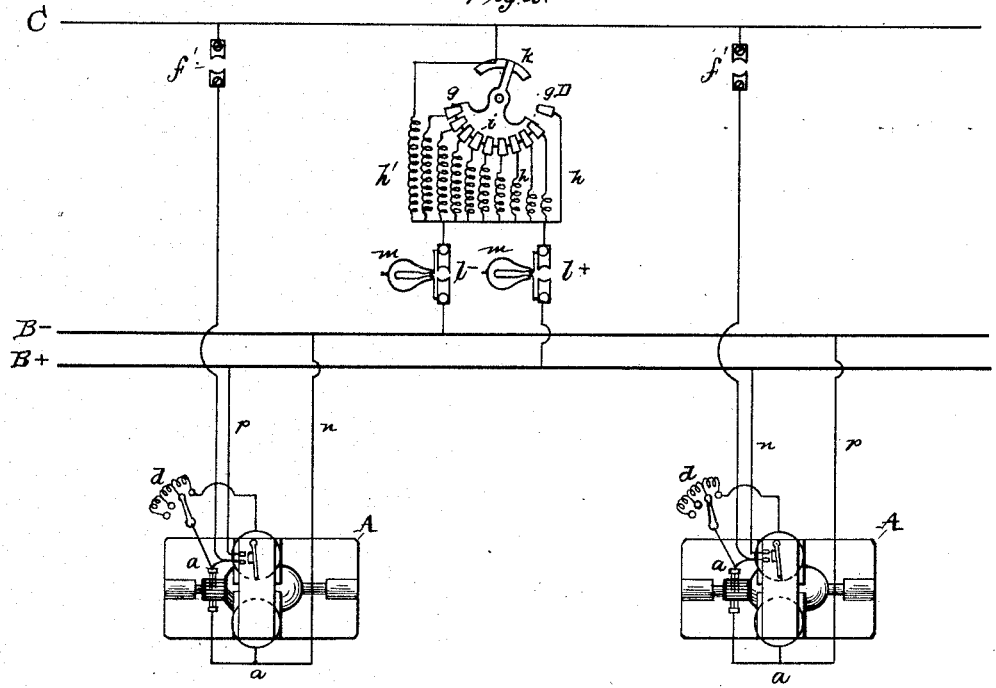

UNITED STATES PATENT OFFICE.

JOHN W. HOWELL, OF NEW BRUNSWICK, ASSIGNOR TO HIMSELF AND FRANCIS R. UPTON, OF ORANGE, NEW JERSEY.

MODE OF CONNECTING AND DISCONNECTING GENERATORS FOR ELECTRIC LIGHTING.

SPECIFICATION forming part of Letters Patent No. 353,035, dated November 23, 1886.

Application filed June 5, 1886. Serial No. 204,235. (No model.)

*To all whom it may concern:*

Be it known that I, JOHN W. HOWELL, of New Brunswick, in the county of Middlesex and State of New Jersey, have invented certain new and useful Improvements in Systems of Electric Lighting, of which the following is a specification.

My invention relates to a system in which a number of dynamo-electric generators are employed to supply current, all of such generators being driven from the same line-shafting, and each having a loose pulley on such shaft and a clutch for positively connecting such pulley to the shaft when it is desired to start the machine, so that the shaft need not be stopped. If it is desired to start a machine when the shaft is running, it is necessary that the loose driving-pulley should first be made to run as fast as the shaft is running, and in the same direction, otherwise the two parts of the clutch cannot readily be thrown together; or, if they are connected, the sudden starting up of pulley and dynamo will probably break the clutch or the pulley. When a machine is running and it is desired to stop it, it is necessary to first take the strain off the driving-pulley before throwing the clutch out of engagement.

My invention consists, mainly, in converting the generator into a motor supplied with current from the other machines, first, when it is desired to start a machine, so that the motor drives its loose pulley and brings it up to the speed of the shaft; and, second, when it is desired to stop a machine, so that the strain is taken off the pulley.

My invention is illustrated in the accompanying drawings, in which Figure 1 is a view, partly in diagram, showing generators and their connections embodying said invention as applied to a three-wire system of distribution; and Fig. 2 illustrates the arrangement of circuits for a two-wire system.

A A' A², &c., represent dynamo-electric machines.

B+, B, and B— are the main or omnibus wires at the station, with which the dynamos are connected by supply-conductors $p\ n\ c$. Each dynamo has its field-circuit $a\ a$ in multiple arc, and each field-circuit includes an adjustable resistance, $d$. Each armature or supply circuit is provided with a switch, $e$, for opening and closing the same.

The two dynamos $A^4\ A^5$ each have a switch, $A^6$, for changing the machines from one side of the system to the other. The remaining dynamos have not such switches, each being arranged to work on one or the other side.

C is an extra conductor. From the lower plate of switch $e$ of each machine a wire, $f$, extends to this conductor, and each of such wires has a plug or other switch, $f'$.

D is a resistance-switch or commutator connected between wires C and a wire, E. This switch consists of a number of contact-plates, $g\ g$, each of which, except the last on the right, is connected through a resistance-coil, $h$, with wire E. The last contact $g$ is connected to E by a wire without any resistance-coil. The pivoted arm $i$ is adapted to bridge all the plates $g\ g$ with one end, and its other end rests constantly on metal plate $k$, connected to wire C. The switch is shunted by a resistance, $h'$, which is always in circuit. The resistance-coils $h'\ h$ are of different resistances, that constantly in circuit being the highest, and those first placed in circuit being higher than the subsequent ones. Wire E is separately connected with each of the three omnibus wires, the connecting-wires each having a plug-switch, $l+$, $l$, or $l-$. Around each plug-switch two incandescent electric lamps, $m\ m$, in series are shunted.

F is the shaft from which the dynamos are run. Each dynamo-shaft is connected by a belt, G, with its driving-pulley H, such pulleys being normally loose on shaft F. I I are positively-locking clutches keyed on shaft F, and adapted to be slid into engagement with the driving-pulleys to lock them to the shaft.

The operation of my invention is as follows: In a three-wire system, two of the machines are always started and stopped with the shaft. The same two machines are not always used, however, and therefore all the machines are provided with loose pulleys and clutches for connecting them with the shaft. If, when such machines are running, it is desired to start another, I proceed as follows: I first close the field-circuit $a\ a$ of the machine to be connected, and cut out all the field-resistance $d$, so that the machine has a very strong field-magnet. I then close the plug-switch $f'$ of the machine, which connects its open armature-conductor with conductor C. The other armature-conductor is constantly connected to one of the three omnibus-conductors. At this time the switch D is open, so that all the coils $h$ are out of circuit, coil $h'$, however, remaining in circuit. The machine is thus connected with the circuit through the lamps $m$. The relative incandescence of these lamps is then noted by the eye, to determine which pair of them has one hundred volts over it. If only one pair come to such incandescence as to show that they have a current of one hundred volts over them, this will be the pair $l$, and this shows that the machine's closed armature-conductor is connected with either the positive conductor B+ or the negative conductor B−, and I then close the plug-switch $l$, so as to connect it between such conductor and the neutral wire B. If two pairs have one hundred volts over them, they will be the two outside pairs, and this shows that the closed armature-conductor is connected to the neutral omnibus wire. Then, if the machine is intended to run on the positive side of the system, I close switch $l+$, but if on the negative side I close $l−$. The lamps $m\,m$, it will be seen, serve merely as indicators to show how the machine should be connected, which obviates the necessity for knowledge on the part of the operator as to how each machine is connected and in which side of its armature-circuit its switch is placed. The machine now is connected in its proper place in circuit, through the high-wire resistance $h'$, and I now turn the switch D and bring the coils $h$ successively into circuit, which lowers the resistance and allows the machine to start slowly as a motor in the same direction in which it is intended to run as a dynamo, and gradually increases the speed of the motor, until finally all the coils are short-circuited by the switch reaching the last contact $g$. The dynamo-switch $e$ may now be closed, bringing the machine into its proper place in the circuit, and the field of the machine is then weakened and its speed thus increased until the pulley H is brought up to approximately the same speed as the shaft F, when the clutch I is thrown in, connecting the pulley with the shaft, and so the machine continues to run, but now as a generator, giving current to the line. The field-magnet is strengthened until it does its share of the work. The plug-switches connecting with wire C may then be removed.

To stop a machine, its field-magnet is weakened until it becomes a motor, and the strain is thus taken from the pulley, so the clutch can be readily disengaged. The field is then increased, and then the armature-switch is opened, and the machine being thus deprived of motive power will come to rest.

If it is desired to stop the dynamo quickly, or if there should be friction enough after the clutch is thrown out to keep the machine running, I may proceed as follows: First weaken the magnets until the machine runs as a motor, and then throw out the clutch. Insert the plug at $f'$, and strengthen the field again. Then observe the relative candle-power of lamps $m$, as before, open dynamo switch, and insert the right plug $l$, $l+$, or $l−$. This connects the dynamo to the adjustable resistance, and this is brought gradually into circuit until enough load is on the generator to bring it to rest. Plugs B and D may then be removed. In all cases after stopping or starting a machine the switch D should be turned so as to disconnect all the coils $h$.

Fig. 2 illustrates the arrangement of a two-wire system, the shafts, belts, and pulleys being omitted. The connections are the same as in the three-wire system, except that the neutral omnibus-wire and the connections thereto are omitted, and the operation is as before described.

Only one indicator-lamp is employed around each plug, since the electro-motive force is only one-half that of the three-wire system. The lamps are employed in the same way, their relative candle-power showing which conductor the connection should be made with.

It is evident that instead of loose pulleys on the shaft each dynamo may have a loose pulley and clutch on its own armature-shaft, such loose pulley being connected by a belt with the main shaft. This arrangement is evidently the equivalent of that shown.

What I claim is—

1. The method of operation for dynamo-electric machines in a system wherein two or more such machines are adapted to be driven from the same shaft, consisting in running a machine as a motor to bring its loose pulley to approximately the same speed as the shaft before connecting said pulley to said shaft, and also in running the machine as a motor to take the strain off the pulley before disconnecting the pulley from the shaft, substantially as set forth.

2. The method of starting a dynamo-electric machine in a system in which two or more such machines are adapted to be driven from the same shaft, consisting in first running said machine as a motor to bring its loose driving-pulley to approximately the same speed as the shaft and then connecting said pulley to said shaft, substantially as set forth.

3. The method of stopping a dynamo-electric machine in a system in which two or more such machines are adapted to be driven from the same shaft, consisting in first converting the machine into a motor to relieve the strain on the driving-pulley and then disconnecting said pulley from the shaft, substantially as set forth.

4. The method of operation for a dynamo-electric machine in a system in which two or more such machines are adapted to be driven from the same shaft and to supply current to the same system of conductors, consisting in first (when a machine is to be started) connecting the machine to said conductors through a resistance and running the same as a motor, gradually removing said resistance until the driving-pulley is brought to approximately the same speed as the shaft, and then connecting said pulley with said shaft, and, second, (when the machine is to be stopped,) converting the same into a motor to take the strain off the driving-pulley, then disconnecting said pulley from the shaft, and then disconnecting the machine from the circuit, substantially as set forth.

5. The method of starting a dynamo-electric machine in a system in which two or more such machines are adapted to be driven from the same shaft, consisting in first connecting said machine to the circuit through a resistance and with a strong field-magnet, gradually removing such resistance from the circuit to start the machine as a motor, gradually weakening the field to increase the speed of the motor until the driving-pulley runs at approximately the same speed as the shaft, and then connecting said pulley with said shaft, substantially as set forth.

6. The method of stopping a dynamo-electric machine in a system in which two or more such machines are adapted to be driven from the same shaft, consisting in weakening the field-magnet of the machine until the same becomes a motor, disconnecting the driving-pulley from the shaft, disconnecting the machine from the circuit and throwing it on a load, strengthening the field again until the machine comes to rest, and finally disconnecting the machine from its load, substantially as set forth.

7. In a system of electrical distribution, the combination of a shaft, two or more dynamo-electric machines, a loose pulley on said shaft for each machine, means for connecting the pulley with the shaft, main conductors with which each machine is adapted to be electrically connected, an additional conductor leading from one terminal of each machine and adapted to be connected to either of said main conductors through an adjustable resistance, and means for varying the electro-motive force of each machine, substantially as set forth.

8. In a system of electrical distribution, the combination of a shaft, two or more dynamo-electric machines, a loose pulley on said shaft for each machine, means for connecting the pulleys with the shaft, main conductors with which each machine is adapted to be electrically connected, an extra conductor, a conductor leading from a terminal of each machine to said extra conductor and provided with a switch, an adjustable resistance connected with said extra conductor, a connection from said adjustable resistance to each of the main conductors, provided with a switch, and means for varying the electro-motive force of each machine, substantially as set forth.

9. In a system of electrical distribution, the combination of a shaft, two or more dynamo-electric machines, a loose pulley on said shaft for each machine, means for connecting the pulleys with the shaft, main conductors with which each machine is adapted to be electrically connected, an extra conductor, a conductor leading from each machine to said extra conductor and provided with a switch, an adjustable resistance connected with said extra conductor, a connection from said adjustable resistance to each of said main conductors, provided with a switch, a high-resistance shunt around each of such switches including an electrical indicator, and means for varying the electro-motive force of each machine, substantially as set forth.

This specification signed and witnessed this 3d day of June, 1886.

JOHN W. HOWELL.

Witnesses:
WM. PELZER,
ED. C. ROWLAND.